United States Patent
Zwijze et al.

(10) Patent No.: US 9,372,064 B2
(45) Date of Patent: Jun. 21, 2016

(54) METHOD AND APPARATUS FOR SENSING POSITIONS OF A PLURALITY OF MAGNETS

(71) Applicants: Albert F. Zwijze, Vriezenveen (NL); Kent E. Van Ostrand, Freeport, IL (US)

(72) Inventors: Albert F. Zwijze, Vriezenveen (NL); Kent E. Van Ostrand, Freeport, IL (US)

(73) Assignee: Sensata Technologies, Inc., Attleboro, MA (US)

( * ) Notice: Subject to any disclaimer, the term of this patent is extended or adjusted under 35 U.S.C. 154(b) by 67 days.

(21) Appl. No.: 14/195,103

(22) Filed: Mar. 3, 2014

(65) Prior Publication Data

US 2014/0266158 A1    Sep. 18, 2014

Related U.S. Application Data

(60) Provisional application No. 61/781,706, filed on Mar. 14, 2013.

(51) Int. Cl.
*G01B 7/30* (2006.01)
*G01D 5/14* (2006.01)

(52) U.S. Cl.
CPC . *G01B 7/30* (2013.01); *G01D 5/145* (2013.01)

(58) Field of Classification Search
CPC .................................. G01B 7/30; G01D 5/145
USPC .......................................... 324/207.2, 207.25
See application file for complete search history.

(56) References Cited

U.S. PATENT DOCUMENTS

| | | | |
|---|---|---|---|
| 2004/0017187 A1* | 1/2004 | Van Ostrand et al. ... | 324/207.21 |
| 2005/0174112 A1* | 8/2005 | Wakabayashi et al. ....... | 324/251 |
| 2011/0043193 A1* | 2/2011 | Aebi et al. ................. | 324/207.2 |
| 2013/0113465 A1* | 5/2013 | Padilla ....................... | 324/207.2 |

* cited by examiner

*Primary Examiner* — Jay Patidar
(74) *Attorney, Agent, or Firm* — Chapin IP Law, LLC

(57) ABSTRACT

In an embodiment, a method may be used to measure a plurality of positions associated with a plurality of magnets based on, for example, a magnetic angle of the magnets. The method may include various acts that may involve, for example, measuring magnetic field components associated with the plurality of magnets. In addition, the acts may include identifying a first angle and a second angle based on the measured magnetic field components. The identified first and second angles may be used to identify a position of a first magnet of the plurality of magnets and a second magnet of the plurality of magnets.

10 Claims, 11 Drawing Sheets

METHOD AND APPARATUS FOR SENSING POSITIONS OF A PLURALITY OF MAGNETS

RELATED APPLICATIONS

This application claims the benefit of and priority to U.S. Provisional Patent Application No. 61/781,706, titled "MAGNETIC ANGLE POSITION SENSOR", which was filed on Mar. 14, 2013, the contents of which are incorporated by reference as though fully set forth herein.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Techniques described herein may be used to measure a plurality of positions associated with a plurality of magnets based on, for example, a magnetic field angle induced by the magnets. In an embodiment, a magnetic angle position sensor may include circuitry that may measure a three-dimensional (3D) field induced by the movement of the magnets. The circuitry may be incorporated in a monolithic integrated circuit (IC). The circuitry may incorporate, for example, Hall-effect techniques to measure the 3D magnetic field.

Specifically, the circuitry may measure a magnetic flux density of magnetic fields associated with the magnets. The magnetic flux density may be applied, for example, orthogonally and in parallel to the circuitry. The circuitry may be sensitive to various magnetic field components of the magnetic fields associated with the magnets. These magnetic field components may include, for example, "Bx", "By", and/or "Bz" components, where "B" may denote a strength of a magnetic field and "x", "y", and "z" may denote a direction of the magnetic field.

Figure 1:
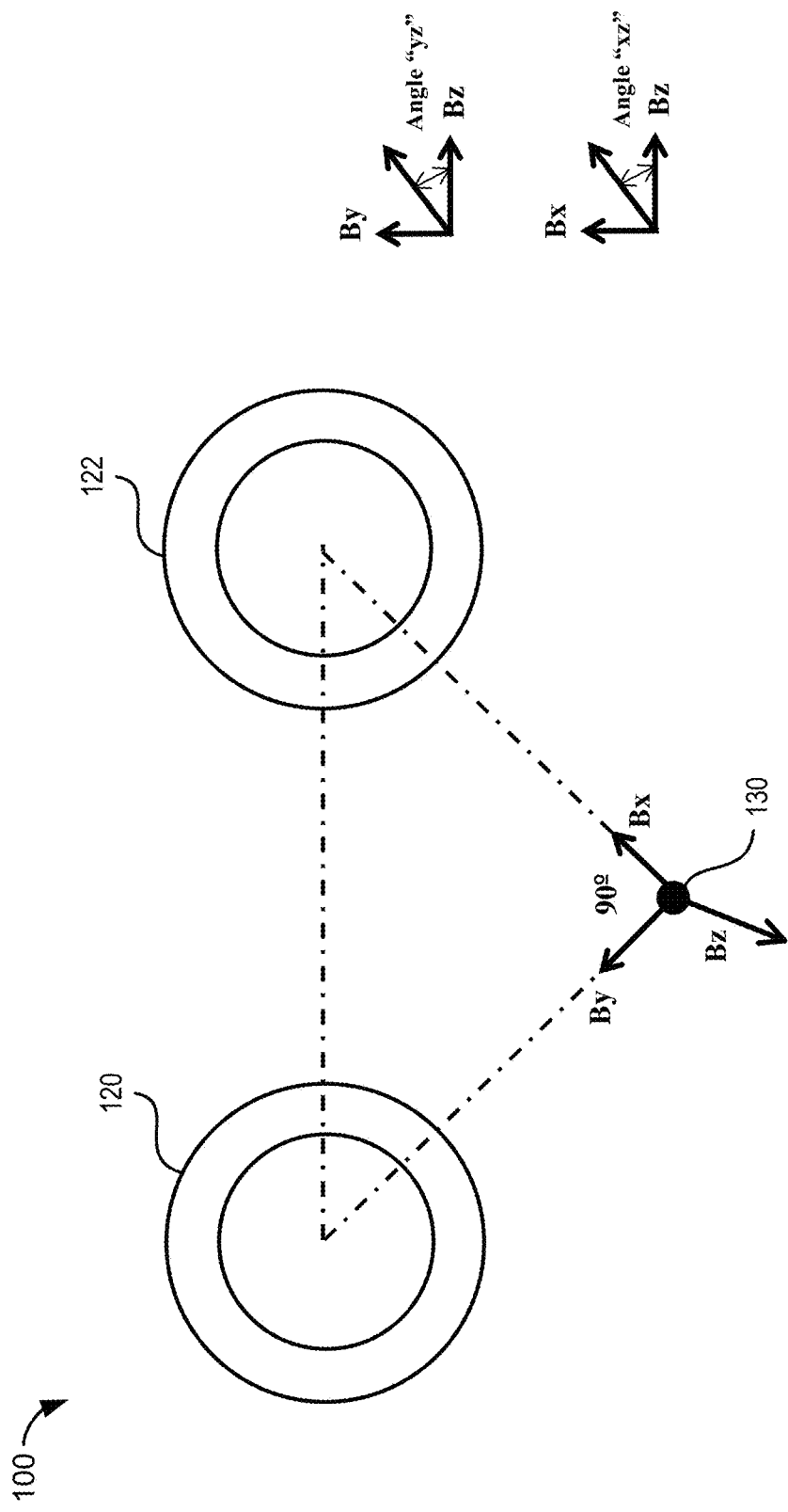
FIG. 1 illustrates an example of a magnetic angle position sensor having two magnets and a sensor.

FIG. 1 illustrates an example of a magnetic angle position sensor 100 having a first magnet 122, a second magnet 120, and a sensing device 130. The magnetic angle position sensor 100 may be used to measure positions of the magnets 120,122 with respect to, for example, a position of the sensing device 130.

Note that magnetic angle position sensor 100 is an example of a device that may incorporate one or more techniques described herein in order to identify positions of magnetic elements such as, for example, magnets. It should be noted, however, that other devices may incorporate one or more techniques described herein to identify positions of magnetic elements. For example, a device containing more than two magnets and two or more sensing devices may implement one or more techniques described herein to identify positions of one or more of the magnets contained in the device.

Referring now to FIG. 1, the first magnet 122 may be shaped as a toroid, although, as will be explained further below, other shapes may be used. The first magnet 122 may include a coating to protect the first magnet 122. The first magnet 122 may be made of a magnetic material. Suitable magnetic materials may include, for example, an iron alloy such as aluminum, nickel, and cobalt (AlNiCo); Neodymium, Ferrite, or Samarium Cobalt. Note that other suitable magnetic materials may be used.

The second magnet 120 may also be shaped as a toroid, although, other shapes such as, for example, shapes described below may be used. The second magnet 120 may also include a coating to protect the second magnet 120. Moreover, the second magnet 120 may also be made of a suitable magnetic material, for example, such as described above.

The sensing device 130 may be a 3D Hall-effect sensor capable of identifying magnetic field components "Bx", "By", and "Bz" associated with magnets 120 and 122. The sensing device 130 may include, for example, electronic circuitry that may be used to identify the "Bx", "By", and "Bz" components.

The sensing device 130 may be contained in an IC. An example of a sensing device that may be used to implement sensing device 130 may include a Triaxis® series sensor IC available from Melexis, Microelectronics Integrated Systems, Ypres, Belgium. An example of a Triaxis® series sensor IC that may be used is the Melexis MLX90365 sensor IC.

The first magnet 122 may be positioned and/or designed such that it influences a "Bx" component that may be identified (e.g., measured) by the sensing device 130 but not a "By" component identified by the sensing device 130. The second magnet 120 may be positioned and/or designed such that it influences a "By" component that may be identified by the sensing device 130 but not a "Bx" component identified by sensing device 130.

For example, at an orthogonal point (e.g., 90° point, but the angle may be different from) 90°, the "By" component measured by sensing device 130 may be influenced by the second magnet 120 but not the first magnet 122. Also at the orthogonal point, the "Bx" component measured by the sensing device 130 may be influenced by the first magnet 122 and not the second magnet 120.

"Bz" component readings that may be identified by sensing device 130 may be used to, for example, compensate for temperature and/or drift effects that may be associated with the operation of magnetic angle position sensor 100. The "Bz" component may be perpendicular to, for example, the "Bx" and "By" components. "Bz" may be influenced by both the first magnet 122 and the second magnet 120. For example, the position of the first magnet 122 and the position of the second magnet 120 may influence "Bz".

An Angle "xz" and an Angle "yz" may be identified using "Bx", "By", and "Bz". For example, Angle "xz" may be identified using the formula: Angle "xz"=arctan(Bx/Bz).

Angle "yz" may be identified, for example, using the formula: Angle "yz"=arctan(By/Bz). As will be described further below, Angle "xz" may be used to identify a position of magnet 122 and Angle "yz" may be used to identify a position of magnet 120.

Note that a position of magnet 120 and a position of magnet 122 may involve various factors. These factors may include, for example, a shape of the magnets 120, 122; a distance between the magnets 120, 122, and sensing device 130; a distance between the magnets 120, 122; and an angle of the sensing device 130 with respect to magnets 120, 122.

Magnetic angle position sensor 100 may be implemented in various apparatuses. An example of an apparatus that may implement a magnetic angle position sensor such as, for example, magnetic angle position sensor 100 may include a double clutch transmission (DCT). It should be noted that other apparatuses may implement magnetic angle position sensors that incorporate one or more techniques described herein. An example of an apparatus 600 that may implement magnetic angle position sensor 100 will be described further below with respect to FIG. 6.

Figure 2A:
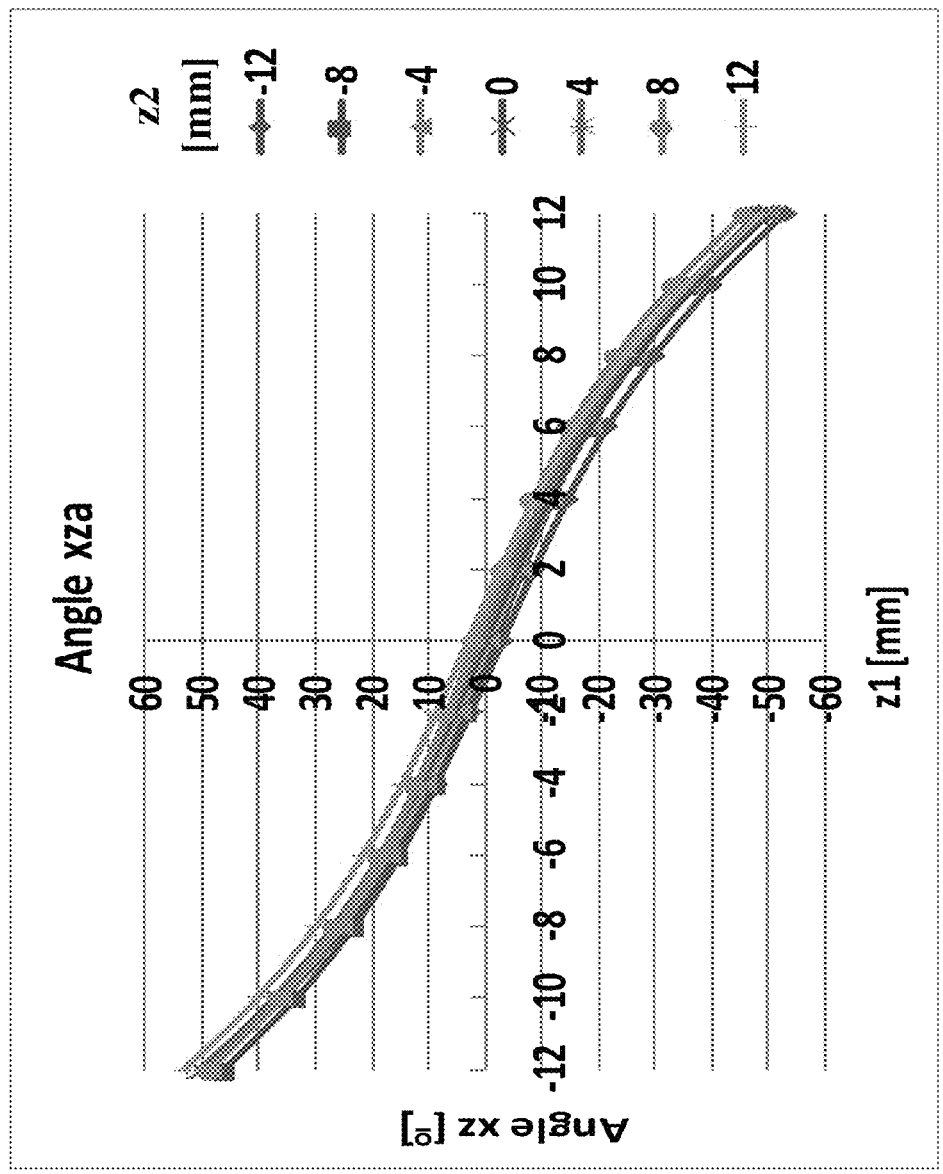
FIGS. 2A-B illustrate example graphs of an association between an angle and positions of two magnets.

FIG. 2A illustrates an example graph of an association between Angle "xz" and positions of magnets 120 and 122. Referring to FIG. 2A, a position of first magnet 122 may be identified by the variable "z1". A position of second magnet 120 may be identified by the variable "z2".

Figure 2B:
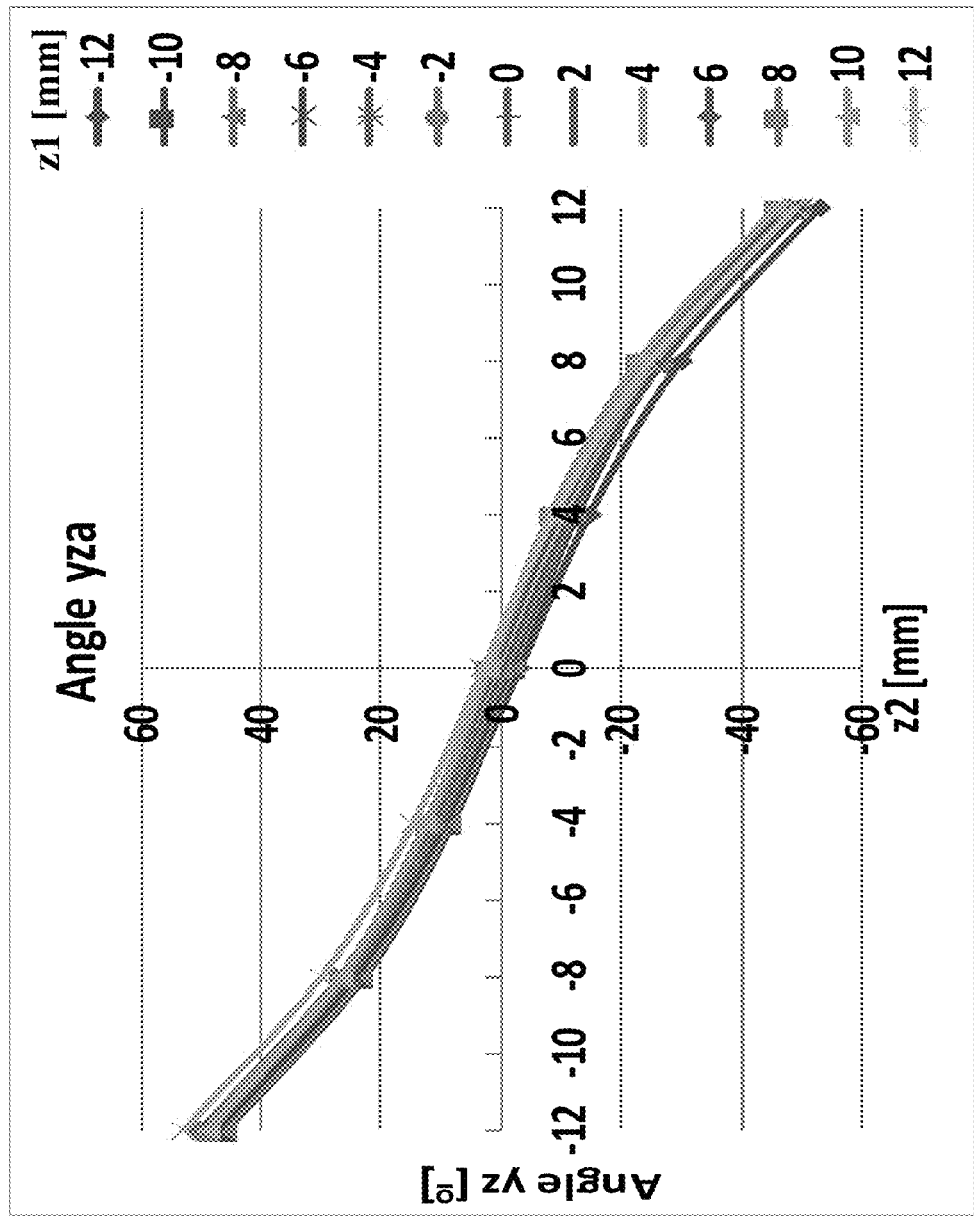

FIG. 2B illustrates an example graph of an association between Angle "yz" and positions of magnets 120 and 122. Referring to FIG. 2B, a position of first magnet 122 may be identified by the variable "z1" and a position of a second magnet 120 may be identified by the variable "z2".

By combining both graphs 2A and 2B, the two unknown positions "z1" and 'z2" may be identified knowing Angle "xz" and Angle "yz".

Figure 2C:
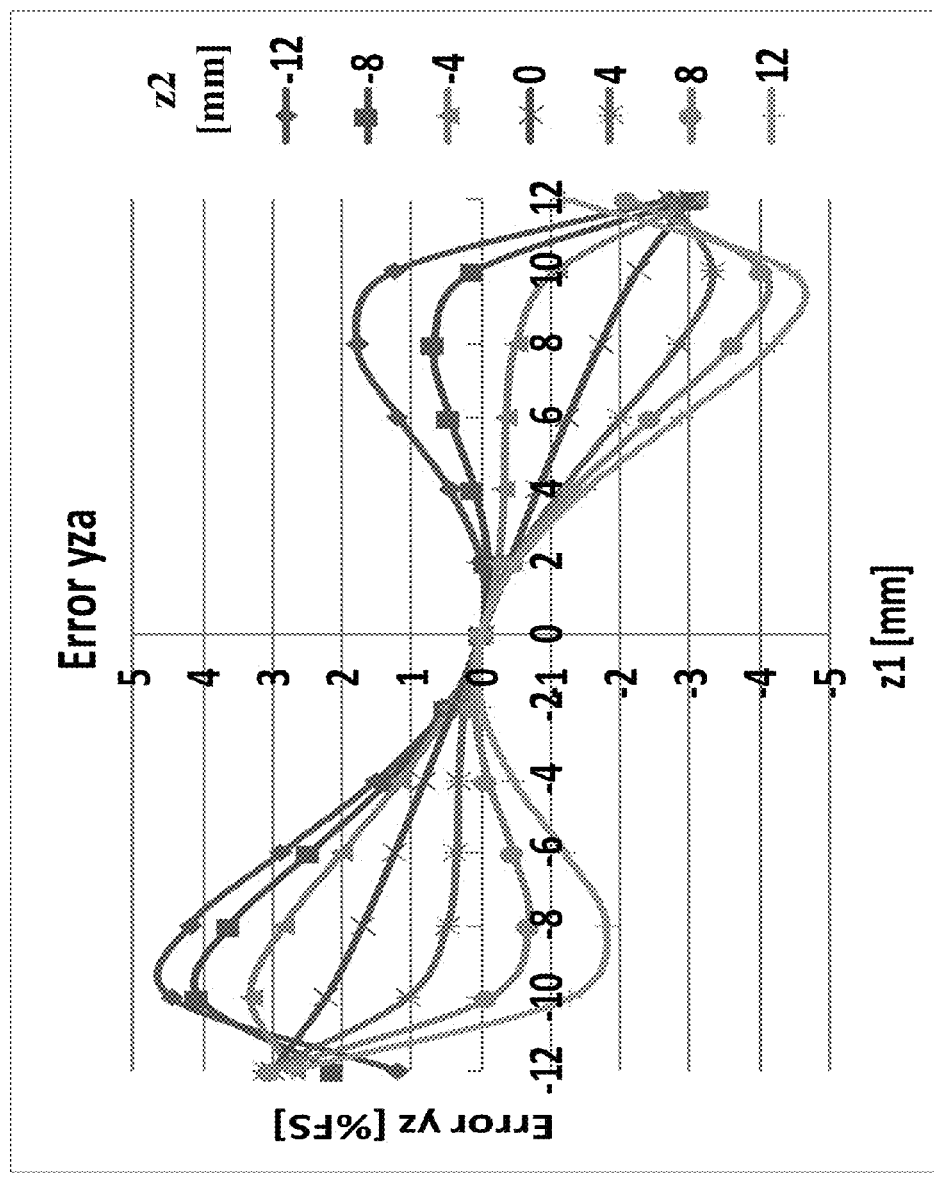
FIG. 2C illustrates an example graph showing error that may be associated with crosstalk between two magnets.

FIG. 2C illustrates an example graph showing error that may be associated with crosstalk between two magnets such as, for example, first magnet 122 and second magnet 120. Referring to FIG. 2B, suppose an Angle "yz" is associated with a second magnet position "z2". When "Bz" is, for example, zero or a constant function of a first magnet position "z1", crosstalk may be absent.

Now suppose Angle "yz" is associated with the second magnet position "z2" and Angle "yz" is calibrated when "z1" equals zero. Crosstalk may be determined by identifying, for example, a difference between an Angle "yz" curve for "z1" not equaling zero and "z1" equaling zero. This difference may be divided, for example, by a total change in an angle associated with "z1" equaling zero when "z2" is moving through, for example, a whole stroke, resulting in a percent full scale (FS) error.

As shown in the example graph in FIG. 2C, crosstalk may rise to, for example, 4.7% FS. It may be desirable, however, to make crosstalk as low as possible. A non-zero crosstalk may be corrected for based on, for example, identifying Angle "xz" and Angle "yz" and solving for the unknown positions "z1" and "z2" based on the identified angles.

Figure 2D:
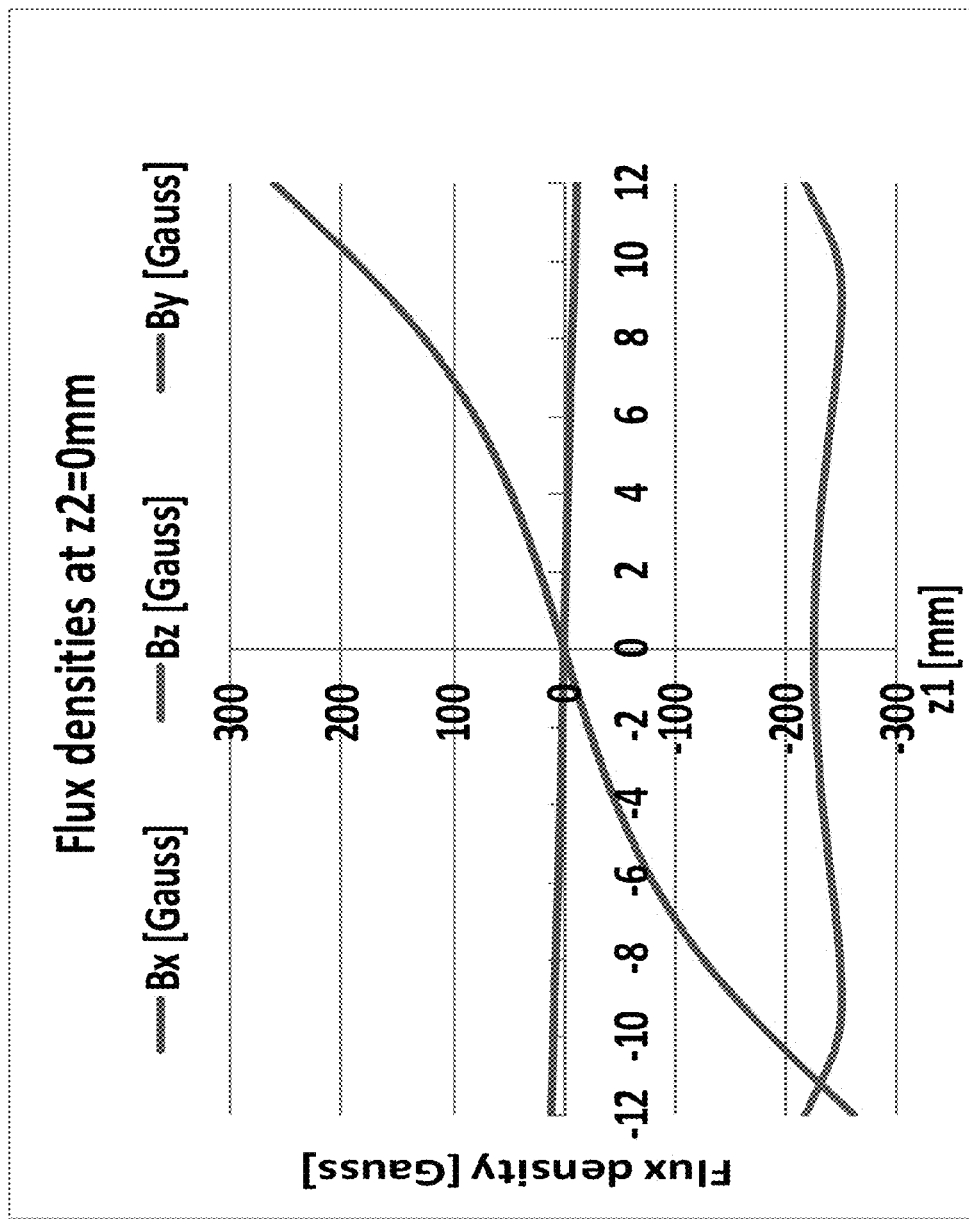
FIG. 2D illustrates an example graph of flux densities that may be associated with a magnet.

FIG. 2D illustrates an example graph of flux densities that may be associated with the first magnet 122. Referring to FIG. 2D, in the example graph, flux densities are shown for the first magnet 122 when, for example, the second magnet 120 is not present. Also in the graph, "By" may be zero which may be explained from a symmetry point of view. In addition, in the example graph, "Bz" may be almost constant which may limit the crosstalk value to 4.7% FS. If "Bz" were to be constant then crosstalk may be, for example, 0% FS which may be a design goal.

Figure 3:
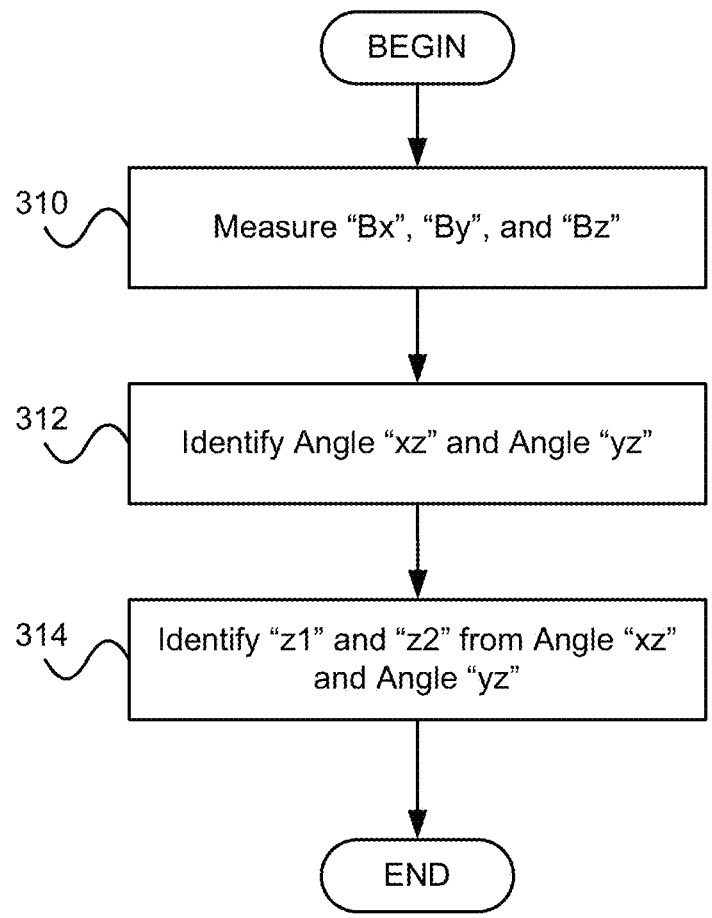
FIG. 3 illustrates a flow chart of example acts that may be used to identify a position of a first magnet and a second magnet.

FIG. 3 illustrates a flow chart of example acts that may be used to identify a position of a first magnet and a second magnet such as, for example, first magnet 122 and second magnet 120, respectively. The first magnet and the second magnet may be part of a magnetic angle position sensor such as, for example, magnetic angle position sensor 100. The magnetic angle position sensor may also include a sensing device such as, for example, sensing device 130.

Referring to FIG. 3, at block 310, magnetic field components "Bx", "By", and "Bz" are measured. Magnetic field components "Bx", "By", and "Bz" may be measured using a sensing device such as, for example, sensing device 130.

Magnetic field component "By" may be influenced by the second magnet. For example, at an orthogonal point, magnetic field component "By" may be influenced by the second magnet and not the first magnet. The magnetic field component "By" may be measured using the sensing device.

Magnetic field component "Bx" may be influenced by the first magnet. For example, at the orthogonal point, magnetic field component "Bx" may be influenced by the first magnet and not the second magnet. The magnetic field component "Bx" may be measured using the sensing device.

At block 312, Angle "xz" and Angle "yz" may be identified. Angle "xy" and Angle "yz" may be identified based on the measured "Bx", "By", and "Bz" magnetic components.

For example, Angle "xz" may be identified based on the formula: Angle "xz"=arctan(Bx/Bz), where "Bx" and "Bz" are the magnetic components "Bx" and "Bz", respectively, measured at block 310. In addition, for example, Angle "yz" may be identified based on the formula: Angle "yz"=arctan(By/Bz), where "By" and "Bz" are the magnetic components "By" and "Bz", respectively, measured at block 310.

At block 314, the position of the first magnet ("z1") and the position of the second magnet position ("z2") may be identified based on Angle "xz" and Angle "yz", which were identified at block 312.

In a magnetic angle position sensor that utilizes, for example, two magnets, both magnets may be polarized in the same direction. Thus, both magnets may contribute to the magnetic field component "Bz". This may mean that a resultant residual flux density field "Br" may be higher when two magnets are used rather than one magnet. The higher field may enable smaller magnets to be used.

Figure 4:
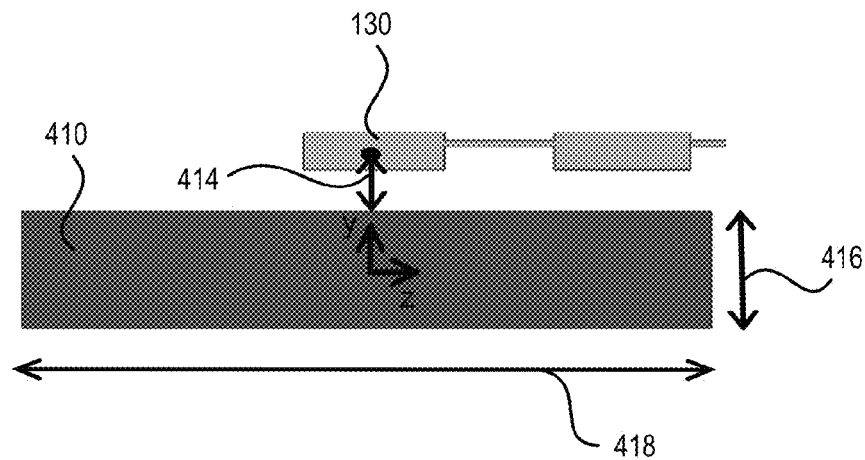
FIG. 4 illustrates examples of magnets that may be used in a magnetic angle position sensor.
Figure 4:
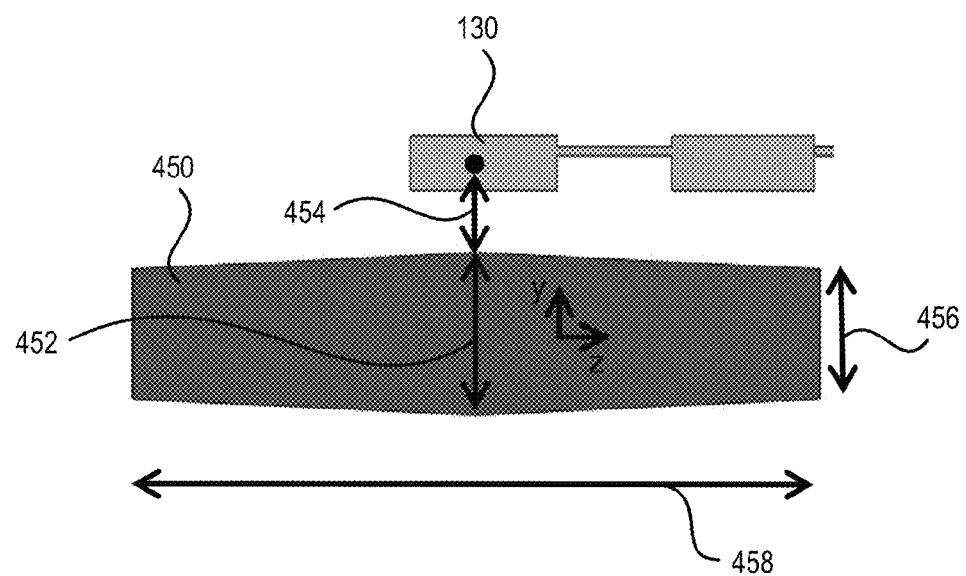

FIG. 4 illustrates examples of magnets 410, 450 that may be used in magnetic angle position sensor 100. Referring to FIG. 4, magnet 410 may be a cylindrically shaped. Arrows 416 may indicate a height of the magnet 410 and arrows 418 may indicate a length of the magnet 410. An example volume of magnet 410 may be 485 millimeters (mm)$^3$.

Arrow 414 may indicate a spacing between sensing device 130 and the magnet 410. The spacing may be such that the magnet 410 may provide a magnetic field intensity that can be measured by sensing device 130.

For example, a resultant field "Br" may be identified using the following formula: "Br"=sqrt(By$^2$+Bz$^2$), where "sqrt" stands for the square root. If the sensing device 130 requires a minimum resultant field "Br" of 200 Gauss, the spacing indicated by arrow 414 may be such that the end of, for example, a stroke of magnet 410 may meet at least this requirement. In fact, due to its design, the magnet 410 may actually provide more than a requisite "Br" for the sensing device 130 and therefore may be considered somewhat over designed.

Magnet 450 is an example of another magnet that may be used in a magnetic angle position sensor such as, for example, a magnetic angle position sensor 100. Magnet 450 may be conically shaped. A length of magnet 450 may be denoted by arrows 458. An example volume of magnet 450 may be 335 mm$^3$.

Arrows 454 may denote a spacing between the sensing device 130 and the magnet 450. The spacing indicated by arrows 454 may be such that at the end of, for example, a stroke of magnet 450 at least the minimum requirement of "Br" for the sensing device 130 is met.

Magnet 450 may have a first width denoted by arrows 452 and a second width denoted by arrows 456. The first width may be a maximum width associated with the magnet 450 and may be located substantially towards the center of the magnet 450. The second width may be located substantially towards one or more ends of the magnet 450. The magnet 450 may gradually taper from the first width to the second width.

Magnet 450 may require less material to manufacture than magnet 410 and therefore may be less expensive to produce than magnet 410. In addition, a "Br" associated with magnet 450 may be closer to a minimum required "Br" by the sensing device 130, thus, the magnet 450 may be not considered over designed as magnet 410 may be considered.

Figure 5A:
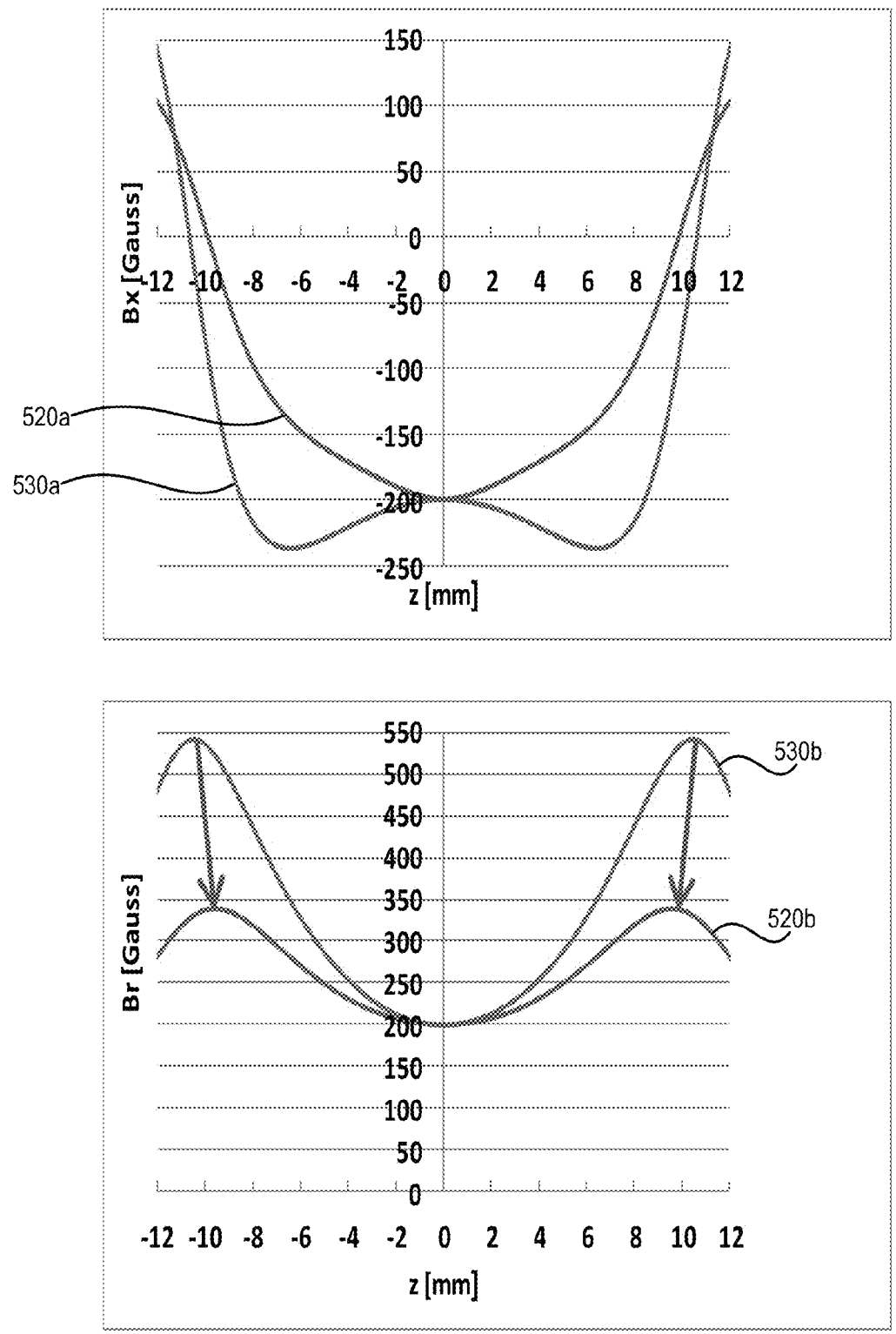
FIG. 5A-C illustrate various graphs showing example outcomes of various parameters associated with a round (cylindrically-shaped) magnet and a cone (conically-shaped) magnet.
Figure 5B:
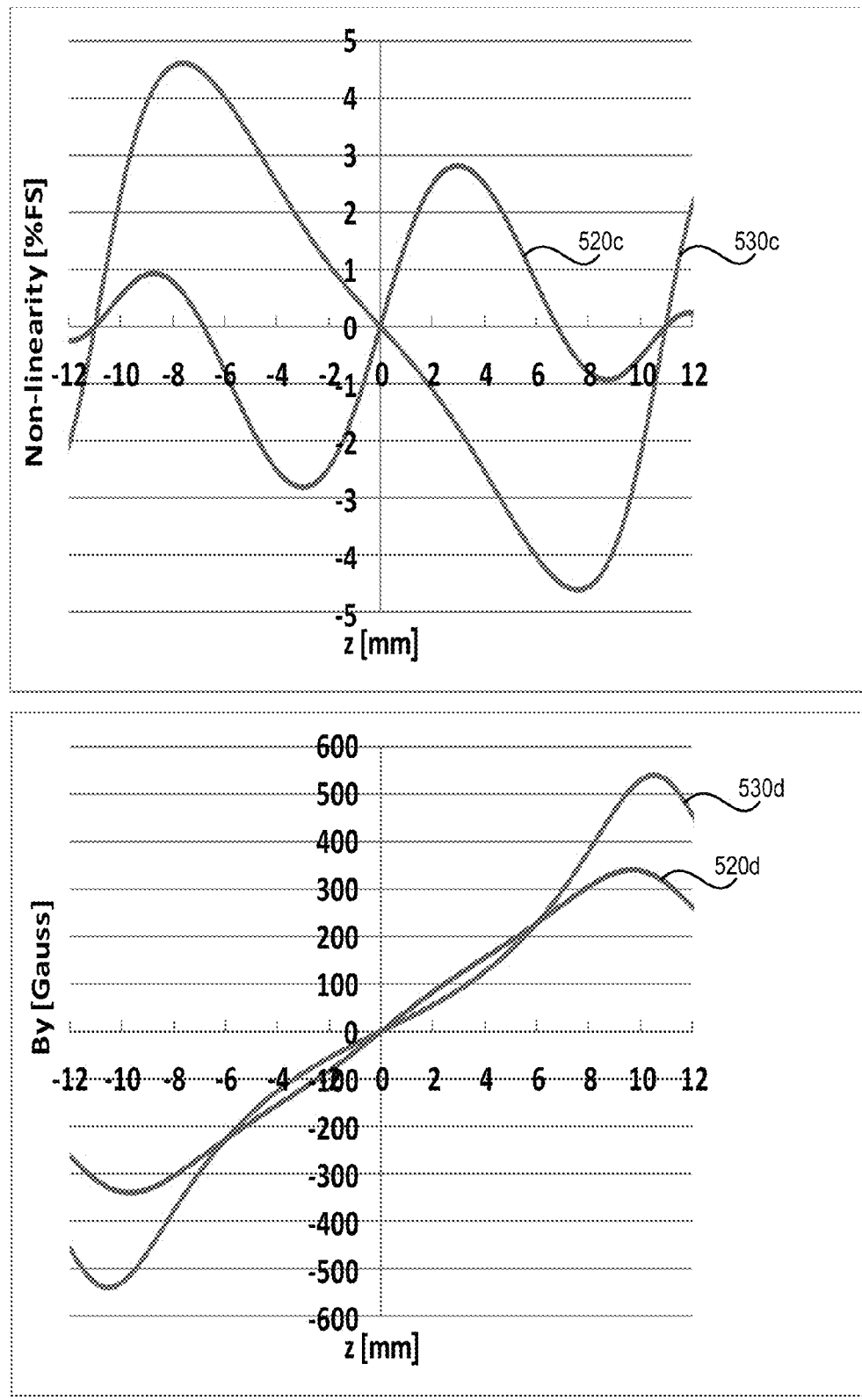
Figure 5C:
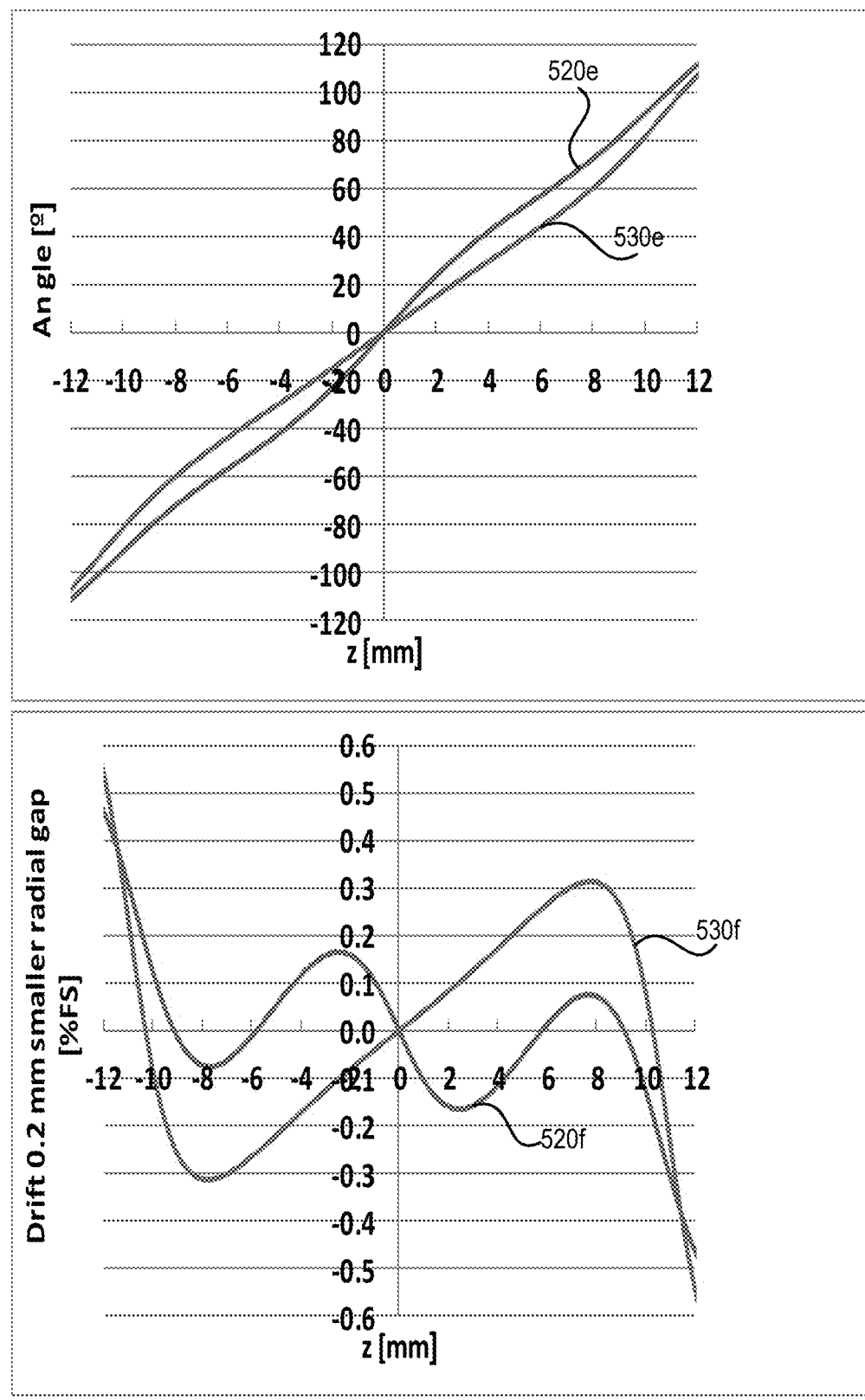

FIGS. 5A-C illustrate various example graphs showing example outcomes of various parameters associated with a round (cylindrically-shaped) magnet and a cone (conically-shaped) magnet. Plots 520*a-f* show examples of outcomes associated with a cone magnet and plots 530*a-f* show examples of outcomes associated with a round magnet. As can be seen by the plots illustrated in FIGS. 5A-C, the example outcomes of the cone magnet and the round magnet tend to show that the cone magnet may outperform the round magnet when used in, for example, a magnetic angle position sensor.

Typical magnet-to-magnet distance may be less than, for example, 40 mm. In this case one sensing device 130 may be used to measure Angle "xz" and Angle "yz". The magnetic influence/crosstalk from magnet 120 on Angle "xz" may be reduced by using Angle "yz". The magnetic influence/crosstalk from magnet 122 on Angle "yz" may be reduced by using Angle "xz".

However, a similar approach may be used when the magnet-to-magnet distance is larger (e.g., 40 mm to 100 mm). In this case two sensing devices instead of one sensing device may be used. Now two techniques may be identified where in a first sensing device Angle_xz_1 and Angle_yz_1 are measured and in the second sensing device an Angle_xz_2 and Angle_yz_2 may be measured.

The first technique may involve an Angle_xz_1 being mainly influenced by the first magnet. The magnetic influence/crosstalk from the second magnet on Angle_xz_1 may be eliminated by using an Angle yz_1. The Angle_xz_2 may be, for example, mainly influenced by the second magnet. The magnetic influence/crosstalk from the first magnet on Angle_xz_2 may be eliminated, for example, by using Angle yz_2.

A second technique may involve an Angle_xz_1 being mainly influenced by the first magnet. The magnetic influence/crosstalk from the second magnet on Angle_xz_1 may be eliminated by using an Angle xz_2. The Angle_xz_2 may be mainly influenced by the second magnet. The magnetic influence/crosstalk from the first magnet on Angle_xz_2 may be eliminated, for example, by using Angle xz_1.

Figure 6:
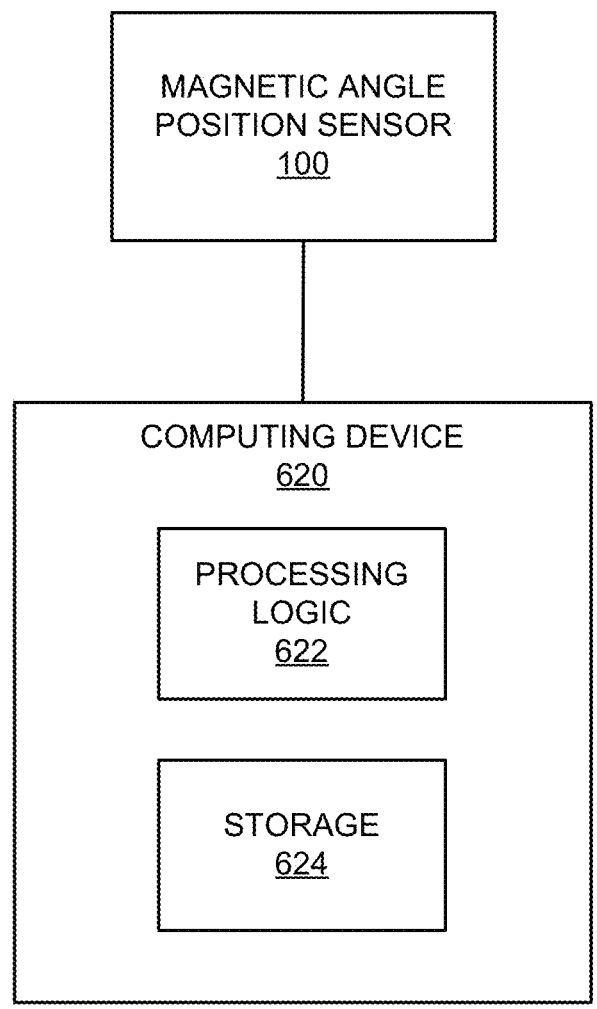
FIG. 6 illustrates an example of an apparatus that may implement one or more techniques described herein.

FIG. 6 illustrates an example of an apparatus 600 that may implement one or more techniques described herein. Referring to FIG. 6, the apparatus 600 may include magnetic angle position sensor 100 and computing device 620. An example embodiment of magnetic angle position sensor 100 is described above.

Computing device 620 may include processing logic 622 and storage 624. Processing logic 622 may include, for example, logic for interpreting, executing, and/or otherwise processing information. The information may include information that may be stored in, for example, storage 624.

Processing logic 622 may include a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may, for example, interpret, execute, manipulate, and/or otherwise process information. Processing logic 622 may comprise a single core or multiple cores. An example of a processor that may be used to implement processing logic 622 include, but are not limited to, an Intel® Atom™ brand processor which is available from Intel Corporation, Santa Clara, Calif.

Storage 624 may provide a storage for the computing device 620. The storage may be a tangible non-transitory storage that may be used to store information such as, for example, computer-executable instructions and/or data that may be used by processing logic 622. The information may include, for example, computer-executable instructions that when executed by processing logic may perform one or more techniques described herein. For example, the information may include computer-executable instructions that when executed by processing logic 622 may perform one or more acts described above with respect to FIG. 3.

Storage 624 may include one or memory devices that may be used to store the information. A memory device may support, for example, serial or random access to information stored in the memory device. A memory device that supports serial access to information stored in the memory device may be referred to as a serial memory device. A memory device that supports random access to information stored in the memory device may be referred to as a random access memory (RAM) device.

A memory device may be, for example, a volatile memory device or a non-volatile memory device. A volatile memory device may be a memory device that may lose information stored in the device after power is removed from the memory device. A non-volatile memory device may be a memory device that may retain information stored in the memory device after power is removed from the memory device.

Examples of memory devices that may be used in storage 624 include, but are not limited to, a dynamic RAM (DRAM) device, flash memory device, static RAM (SRAM) device, zero-capacitor RAM (ZRAM) device, twin transistor RAM (TTRAM) device, read-only memory (ROM) device, ferroelectric transistor RAM (FeTRAM) device, magneto-resistive RAM (MRAM) device, phase change memory (PCM) device, PCM and switch (PCMS) device, nanowire-based device, resistive RAM memory (RRAM) device, and electrically erasable programmable ROM (EEPROM) device.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIG. 3, the order of the acts may be modified in other implementations. Further, non-dependent acts may be performed in parallel.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
    measuring a plurality of magnetic field components associated with a plurality of magnets contained in a magnetic angle position sensor, the plurality of magnetic field components including:
        a strength of a magnetic field of the plurality of magnets in an x-plane (Bx),
        a strength of a magnetic field of the plurality of magnets in a y-plane (By), and
        a strength of a magnetic field of the plurality of magnets in an z-plane (Bz), the x-plane, y-plane, and z-plane being with respect to a point from which Bx, By, and Bz are measured;
    identifying a first angle based on the measured magnetic field components, the first angle representing an angular position associated with a first magnet of the plurality of magnets;
    identifying a second angle based on the measured magnetic field components, the second angle representing an angular position associated with a second magnet of the plurality of magnets;
    identifying a position of the first magnet based on the identified first angle and second angle; and
    identifying a position of the second magnet based on the identified first angle and second angle.

2. The method of claim 1, wherein the magnetic field components are measured using a sensing device.

3. The method of claim 2, wherein the sensing device is a three-dimensional (3D) Hall-effect sensor.

4. The method of claim 1, wherein, the identified position of the first magnet includes a position of the first magnet with respect to the x-plane, y-plane, and z-plane.

5. The method of claim 1, wherein, the identified position of the second magnet includes a position of the second magnet with respect to the x-plane, y-plane, and z-plane.

6. An apparatus comprising:
    means for measuring a plurality of magnetic field components associated with a plurality of magnets contained in a magnetic angle position sensor, the plurality of magnetic field components including:
        a strength of a magnetic field of the plurality of magnets in an x-plane (Bx),
        a strength of a magnetic field of the plurality of magnets in a y-plane (By), and
        a strength of a magnetic field of the plurality of magnets in an z-plane (Bz), the x-plane, y-plane, and z-plane being with respect to a point from which Bx, By, and Bz are measured;
    means for identifying a first angle based on the measured magnetic field components, the first angle representing an angular position associated with a first magnet of the plurality of magnets;
    means for identifying a second angle based on the measured magnetic field components, the second angle representing an angular position associated with a second magnet of the plurality of magnets;
    means for identifying a position of the first magnet based on the identified first angle and second angle; and
    means for identifying a position of the second magnet based on the identified first angle and second angle.

7. The apparatus of claim 6, wherein the magnetic field components are measured using a sensing device.

8. The apparatus of claim 7, wherein the sensing device is a three-dimensional (3D) Hall-effect sensor.

9. The apparatus of claim 6, wherein, the identified position of the first magnet includes a position of the first magnet with respect to the x-plane, y-plane, and z-plane.

10. The apparatus of claim 6, wherein, the identified position of the second magnet includes a position of the second magnet with respect to the x-plane, y-plane, and z-plane.

* * * * *